United States Patent
Callaway, Jr. et al.

(10) Patent No.: US 7,961,828 B2
(45) Date of Patent: Jun. 14, 2011

(54) SYNC BURSTS FREQUENCY OFFSET COMPENSATION

(75) Inventors: Edgar H. Callaway, Jr., Boca Raton, FL (US); Paul E. Gorday, West Palm Beach, FL (US)

(73) Assignee: Motorola Mobility, Inc., Libertyville, IL (US)

( * ) Notice: Subject to any disclaimer, the term of this patent is extended or adjusted under 35 U.S.C. 154(b) by 1738 days.

(21) Appl. No.: 10/959,359

(22) Filed: Oct. 6, 2004

(65) Prior Publication Data

US 2006/0072586 A1 Apr. 6, 2006

(51) Int. Cl.
*H04L 7/00* (2006.01)

(52) U.S. Cl. ........................................ 375/354

(58) Field of Classification Search .................. 375/354, 375/284, 285, 296, 344, 362, 363, 364, 365, 375/366; 370/509, 208, 512, 513, 514, 335, 370/342

See application file for complete search history.

(56) References Cited

U.S. PATENT DOCUMENTS

| | | | |
|---|---|---|---|
| 5,655,022 A * | 8/1997 | Carroll | 380/263 |
| 6,487,252 B1 | 11/2002 | Kleider et al. | |
| 6,549,592 B1 | 4/2003 | Jones | |
| 6,654,339 B1 | 11/2003 | Bohnke et al. | |
| 6,707,856 B1 | 3/2004 | Gardner et al. | |
| 6,738,443 B1 | 5/2004 | Bohnke et al. | |
| 6,768,747 B1 | 7/2004 | Dogan | |
| 6,862,297 B1 | 3/2005 | Gardner et al. | |
| 6,876,675 B1 | 4/2005 | Jones et al. | |
| 6,930,989 B1 | 8/2005 | Jones, IV et al. | |
| 7,277,457 B2 * | 10/2007 | Gorday et al. | 370/509 |
| 7,349,371 B2 * | 3/2008 | Schein et al. | 370/329 |
| 2003/0203717 A1 | 10/2003 | Chuprun et al. | |
| 2004/0047296 A1 * | 3/2004 | Tzannes et al. | 370/252 |
| 2004/0067741 A1 | 4/2004 | Fei et al. | |
| 2004/0151145 A1 | 8/2004 | Hammerschmidt | |
| 2004/0160906 A1 | 8/2004 | Greszczuk et al. | |
| 2004/0170238 A1 | 9/2004 | Matsuyama et al. | |
| 2004/0184484 A1 | 9/2004 | Marchok et al. | |
| 2004/0196916 A1 | 10/2004 | Bohnke et al. | |
| 2005/0074036 A1 | 4/2005 | Gorday et al. | |
| 2006/0072529 A1 * | 4/2006 | Mujtaba | 370/338 |

FOREIGN PATENT DOCUMENTS

WO WO 03/039054 A2 5/2003

OTHER PUBLICATIONS

U.S. Appl. No. 10/678,416, Current Application, Motorola, Inc. Gorday et al.

* cited by examiner

*Primary Examiner* — Chieh M Fan
*Assistant Examiner* — Jaison Joseph

(57) ABSTRACT

A method (500) and system for compensation of frequency offset between a first transceiver (102) and a second transceiver (104) in wireless communication are disclosed. The compensation of the frequency offset between two or more transceivers (102, 104) is achieved by transmitting a set of frequency synchronization bursts. These bursts contain information about the frequency offset. The frequency synchronization bursts are transmitted by the first transceiver at a range of frequencies above and below its carrier frequency (502). When system conditions permit, a subset of the set of frequency synchronization bursts may be transmitted instead of transmitting the full set of frequency synchronization bursts.

12 Claims, 9 Drawing Sheets

SYNC BURSTS FREQUENCY OFFSET COMPENSATION

FIELD OF THE INVENTION

The present invention relates to wireless communication systems. More particularly, the invention provides a method and system for time and frequency offset compensation in wireless communication systems. The invention may also be extended to wireline systems employing bandpass communications.

BACKGROUND OF THE INVENTION

Over the past few decades, there have been significant advancements in the field of wireless communication. Wireless technology has found applications in a variety of areas such as telephony, control of industrial devices, entertainment and many more. Some common examples of wireless communication systems include mobile phones, cordless phones, pagers, and wireless LANs.

Wireless communication systems typically involve the use of transmitters and receivers for the transmission and the reception of data signals respectively. The data signals are embedded in a carrier wave. The carrier wave is typically a sinusoid whose oscillation frequency is referred to as the carrier frequency. The carrier wave is modulated at the transmitter end according to certain characteristics of the data signal. During modulation, a particular characteristic, such as amplitude or frequency, of the carrier wave is varied according to the data signal. The carrier wave, which is modulated using the data signals, is termed as a modulated carrier wave. The modulated carrier wave is demodulated at the receiver end to recover the original data signals. Thus, the data signals are exchanged between the transmitter and the receiver.

For effective exchange of data signals in a wireless communications system, it is imperative that both the transmitter and the receiver operate at the same carrier frequency. Consistency of frequency is ensured by using frequency references in devices such as transmitters and receivers. A frequency reference is an oscillator that produces a standard frequency, from which the operating frequencies of the receiver and the transmitter are derived. Typically, a frequency reference is implemented using a piezo-electric crystal. Other types of frequency references, including those constructed of integrated circuit elements such as resistors, inductors and capacitors, tend to be less accurate and less expensive than the crystal-based references. In general, the reference elements in the transmitter and the receiver are different and produce slightly different frequencies. Even if the transmitter and the receiver reference elements are of similar design, they may produce different frequencies or vary over time due to manufacturing variation and environmental factors such as temperature, vibration, and aging. This leads to a mismatch between the carrier frequencies at which the transmitter and the receiver operate. This mismatch is termed as frequency offset. The frequency offset between the transmitter and the receiver is a major hindrance in achieving efficient exchange of data signals between the two devices. The frequency offset needs to be compensated in order to improve the quality of wireless communication.

The usage of crystal frequency references at both the transmitter as well as the receiver ends presents an adequate technical solution to the problem of controlling the frequency offset. However, the large size and high cost of piezo-electric crystals are undesirable. The high cost of frequency reference is a limitation especially in low-cost, battery-powered communications equipment designed for sensing and logistics applications.

There exist a number of techniques dealing with frequency offset in wireless communication. In one known technique, an initial estimate of the frequency offset is obtained using a time average of either phase or correlation samples of a data packet preamble, the data packet being a collection of a fixed number of data bits. This method also estimates the frequency offset during the transmission of the actual data packet. Hence, an estimate of the frequency offset is obtained.

Another known technique teaches a method for automatically correcting the frequency at the receiver in order to nullify the frequency offset during the exchange of data bits. The frequency offset is estimated using a training sequence. The receiver has the knowledge of the training sequence but not that of the data bits. The frequency correction is achieved by back-rotating the received data bits by the frequency offset estimate. The training sequence is also back rotated by the frequency offset estimate. A second estimate of the frequency offset is obtained using the corrections in the frequency of the data bits as well as the training sequence. The second frequency offset estimate is used to further correct the frequencies of the data symbols.

An automatic frequency compensation apparatus is also known. This apparatus determines a correlation between a baseband signal and a predetermined signal. The baseband signal is the actual data signal that is transmitted. When the correlation exceeds a reference value, the apparatus effects the frequency offset compensation to the baseband. An equalizer is used after the frequency offset compensation. The frequency offset can further be predicted using the output of the equalizer. The prediction is also effected during the training period when the correlation exceeds the reference value.

While the above cited techniques and apparatus deal with the frequency offset problem, the receivers described in these publications require a large bandwidth. The requirement for a large bandwidth exists because the receivers have to process the received signal and also a range of offset frequencies. This results in an undesirable degradation in the receiver sensitivity.

There also exist other methods for achieving frequency offset compensation. For example, in Direct Sequence Spread Spectrum (DSSS) type of modulation, Differential Chip Detection (DCD) can mitigate frequency offset of approximately 10 to 30 percent of chip rate. DSSS is a modulation technique utilizing a digital code sequence having a coded bit rate, or chip rate, much higher than the information signal bit rate. Data signals are transmitted as a collection of a number of data bits. Each data bit consists of a number of code bits, or chips. In DCD, each chip is processed differentially with respect to previous chips. The frequency offset can be mitigated to a certain extent because the time difference between the chips is short. While this technique is more efficient in trading the frequency offset tolerance for receiver sensitivity than other techniques, there is a trade-off in the bandwidth of the spread signal that must be applied to mitigate a given amount of frequency offset. Further, the signal bandwidth is often constrained because of regulatory considerations. Thus, this technique is limited in its effectiveness in mitigating the frequency offset by the available bandwidth of the signal. Also, the higher chip rates imply increased power and complexity, which is undesirable in low-cost, battery powered communications hardware.

In addition, devices in wireless communication systems often operate in synchrony, transmitting and receiving at scheduled times and employing a low power sleep mode at other times, to extend battery life. Battery life is maximized when the time spent in the low power sleep mode is maximized, yet it is important that wireless devices do not miss scheduled transmission and reception periods. Such a miss can occur, for example, if the time base references of wireless devices differ slightly, and do not define exactly the same time interval. This can produce a situation in which a device transmits, but its target device is not receiving, leading to a loss of communication. This mismatch between the times the transmitting device transmits, and the time the receiving device is expecting the transmission, is termed time offset. Due to time offset, receiving devices must turn on their receivers early to ensure communication; this reduces the amount of time they can be in the low power sleep mode, and therefore reduces their battery life. Wireless communication systems can minimize time offset by employing high-quality time base references; however, the economics of time base references, and the size and cost drawbacks of high-quality time base references, are similar to those of frequency references discussed above.

From the above discussion, it is evident that there exists a need for a technique that compensates large frequency offsets while minimizing degradation in the receiver sensitivity. The technique should minimize the power dissipation and the complexity in the receiver and the transmitter. The technique should mitigate the frequency offset but should not increase the size and cost of the receiver and the transmitter. Similarly, it is evident that there exists a need for a technique that compensates large time offsets while maximizing time spent in a low power sleep mode. The technique should minimize the power dissipation and the complexity in the receiver and the transmitter. The technique should mitigate the time offset but should not increase the size and cost of the receiver and the transmitter.

DETAILED DESCRIPTION OF THE DRAWINGS

Figure 1:
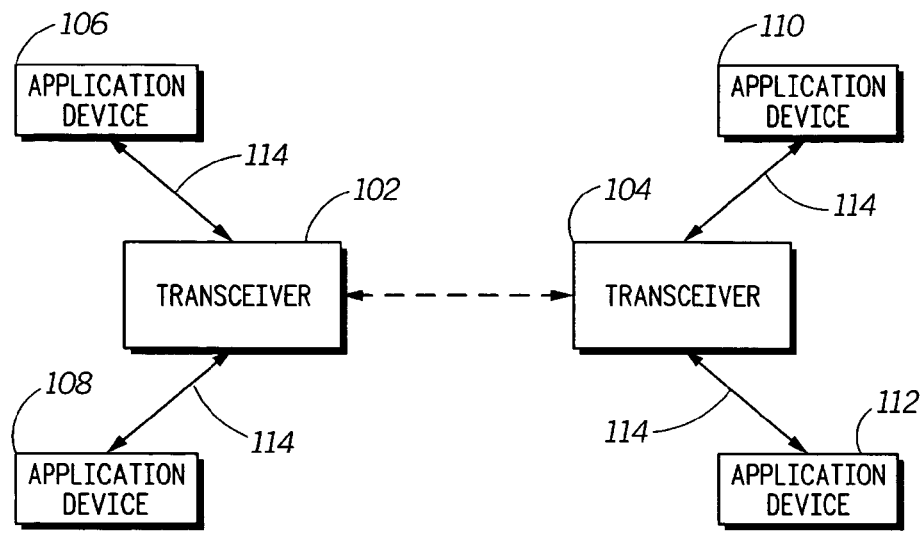
FIG. 1 is a block diagram representing the present invention.

To address the above-mentioned need a method and apparatus for transmitting a plurality of synchronization bursts is provided herein. More particularly, the compensation of the frequency offset between two or more transceivers (102, 104) is achieved by transmitting a set of frequency synchronization bursts. These bursts contain information about the frequency offset. The frequency synchronization bursts are transmitted by the first transceiver at a range of frequencies above and below its carrier frequency (502). When system conditions permit, a subset of the set of frequency synchronization bursts may be transmitted instead of transmitting the full set of frequency synchronization bursts.

The present invention encompasses a method for transmitting a plurality of synchronization bursts for time or frequency offset compensation. The method comprises the steps of determining a system condition and based on the system condition, either transmitting a first plurality of synchronization bursts over a first plurality of frequencies or transmitting a second plurality of synchronization bursts over a second plurality of frequencies.

The present invention additionally encompasses an apparatus for transmitting a plurality of synchronization bursts for time or frequency offset compensation. The apparatus comprises a controller analyzing a system condition, and a transmitter either transmitting a first plurality of synchronization bursts over a first plurality of frequencies or transmitting a second plurality of synchronization bursts over a second plurality of frequencies based on the system condition.

For convenience, terms that have been used in the description of various embodiments are defined below. It is to be noted that these definitions are given merely to aid the understanding of the description, and that they are, in no way, to be construed as limiting the scope of the invention.

Frequency offset: The difference between the carrier frequencies, at which a transmitter and receiver operate in order to exchange data between themselves, is termed as frequency offset.

Frequency reference: An oscillator that produces a standard frequency for operation of a device is termed as frequency reference.

Time and Frequency Position: The relative position in time and frequency of a frequency synchronization burst with respect to data packets being transmitted and received between devices is termed as time/frequency position of that burst.

Receiver operating frequency: The carrier frequency at which the receiver attempts to receive the transmitted carrier wave is termed as receiver operating frequency. This is the receiver's expected value of the transmitter carrier frequency.

Integrated circuit frequency reference: The frequency reference that is based on integrated circuit technology is termed as integrated circuit frequency reference.

Crystal based frequency reference: The frequency reference that uses a piezoelectric crystal for generation of a standard frequency is termed as crystal based frequency reference.

Carrier frequency: The frequency of the carrier wave, which is used to transmit data from one device to another, is termed as carrier frequency. The carrier wave is modulated using the data to be transmitted.

Data packet: In data communication, a sequence of binary bits, including data and control signals, that is transmitted as a composite whole, is termed as data packet.

DSSS: Direct Sequence Spread Spectrum (DSSS) is a signal modulation technique in which the data signal is multiplied by one or more pseudorandom sequences prior to carrier wave modulation.

Frequency stability: The invariability of the frequency of a signal with time, under the influence of external factors, is termed as frequency stability.

Frequency Synchronization Burst (FSB): A FSB is a signal produced by the transmitter, which aids the receiver in adjusting to the correct frequency. The FSBs are transmitted before the transmission of the data packet begins.

FSB identification number: A number that uniquely identifies each FSB and may be used by the receiver to infer the relative position, in time and frequency, of the FSB with respect to the data packets.

Sender identification number: A number or code that uniquely identifies the device that is transmitting a FSB or data packet.

Recipient identification number: A number or code that uniquely identifies the device for which a FSB or data packet is intended.

Pattern of transmission of FSBs: The manner, in which FSBs are spread across a frequency range and time duration, is termed as a pattern of transmission of FSBs.

Low power sleep mode: A mode of device operation in which the receiver or the transmitter is not fully active. Some circuits may be active, for example those required for timing and maintaining the frequency stability. However, most circuits essential for transmitting or receiving data are turned off in order to minimize power consumption.

Active mode: The normal mode in which a device transmits or receives data, which usually requires all circuitry associated with transmission or reception to be turned on.

Beacons: Periodic packet transmissions used by a network coordinator to synchronize members of a network are termed as beacons. In networks without network coordinators, individual members may send periodic beacons for identification and possible communication with any devices that may be listening.

Beacon period: The time interval between the start of two consecutive beacon transmissions is termed as beacon period. The beacon period is also referred to herein as Tb.

Initiating device: A device that initiates the exchange of data packets in a multi-device communication system is termed as an initiating device.

IEEE 802.15.4™: The IEEE 802.15.4™ standard is put forth by the Institute of Electrical and Electronics Engineers (IEEE) 802.15 Task Group 4 (TG4). The IEEE 802.15.4™ standard relates low data rate, low power, and low complexity solutions for wireless networks.

Zigbee™: Zigbee™ is a non-profit industry consortium comprising semiconductor manufacturers, technology providers, OEMs, and end-users. The Zigbee™ members define global standards for low cost and low power wireless applications.

Network coordinator: A particular device that controls access or operational behavior of other devices within a communication network.

Time base reference: An oscillator that produces a standard time interval for operation of a device is termed as time base reference.

Time offset: The difference between the time a transmitting device transmits, and the time a receiving device expects to receive that transmission, is termed as time offset.

Turning now to the drawings, wherein like numerals designate like components, FIG. 1 is a block diagram representing the present invention. In an embodiment of the invention, transceivers 102 and 104 exchange data over a wireless medium. Application devices 106, 108, 110, 112 represent other devices that are involved in data exchange with transceivers 102 and 104. The application devices are devices that provide data to be transmitted by the transceiver or respond to data received from the transceiver. Examples of the application devices that provide data to be transmitted include wireless sensors, automation devices, remote controls, memory for stored information and the like. Additionally, the application devices may include actuators or user interface devices, which send acknowledgements or data requests. The wireless sensors and automation devices receive and respond to queries for information, whereas the memory receives an address and responds with the data present at that address. The application devices are connected to transceivers via interfaces 114, which may be implemented in a variety of ways like serial bus, parallel bus or wireless connection.

While FIG. 1 shows a two-way link between transceivers operating in accordance with the present invention. An alternative embodiment may include a receive-only device, or a receiver, and a transmit-only device, or a transmitter. The transmitter and the receiver may participate in a one-way link with the transmitter transmitting data packets and the receiver receiving them. Also, while FIG. 1 describes a simple link between two transceivers 102, a more extensive network involving more than two devices could be constructed.

Figure 2:
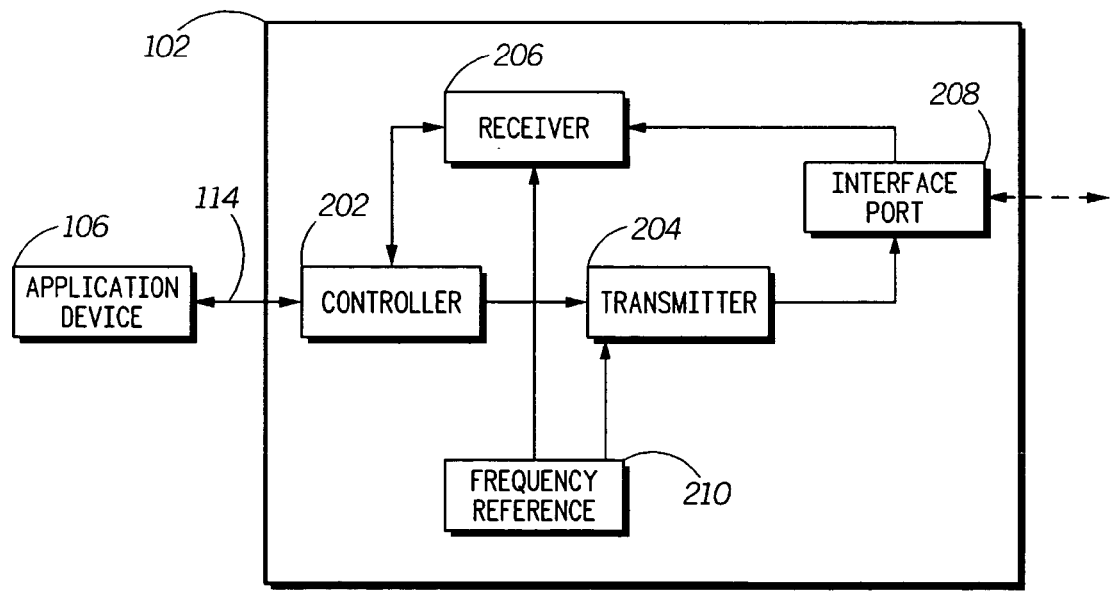
FIG. 2 is a block diagram of a transceiver with a single application device.

FIG. 2 is a block diagram of a transceiver 102 with a single application device 106, in accordance with an embodiment of the present invention. The application device is coupled to a controller 202. Controller 202 is in turn coupled to a receiver 206 and a transmitter 204. Transmitter 204 and receiver 206 are coupled to an interface port 208, which may be an antenna. Transmitter 204 and receiver 206 are also coupled to a frequency reference 210, which facilitates generation of a fixed reference frequency from which the transmitter carrier frequency and the receiver operating frequency are generated. Controller 202, which may be implemented by a microprocessor, may carry out several functions. When transceiver 102 is acting as a transmitter, controller 202 may receive format and code information from the application device. Controller 202 may form the packet, packet header and synchronization burst. Moreover, controller 202 may assign a carrier frequency to a signal to be transmitted and manage the timing and power dissipation of transceiver 102. When transceiver 102 is acting as a receiver, controller 202 may assign operating frequency to receiver 206, decode the received packet, send information to the application device, and manage the timing and the power consumption of transceiver 102. Transceiver 102 may be implemented as a Direct Sequence Spread Spectrum (DSSS) receiving device or other known wireless receiving device. Transceiver 102 may also be implemented as a DSSS transmitter or other known wireless transmitter.

Figure 3:
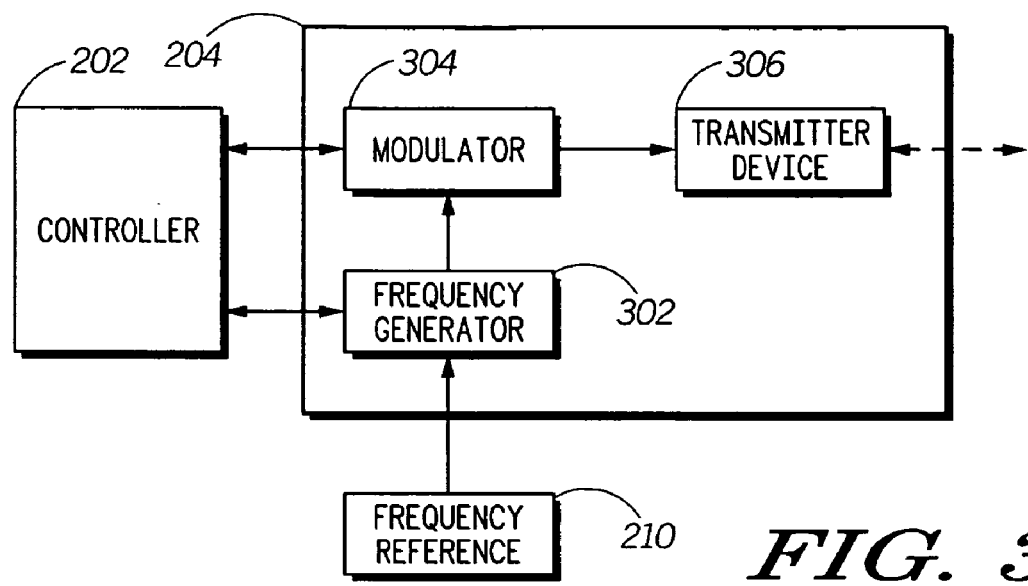
FIG. 3 is a block diagram of a transmitter.

FIG. 3 is a block diagram of transmitter 204, in accordance with an embodiment of the present invention. Transmitter 204 consists of a frequency generator 302, a modulator 304 and a transmission device 306. Transmitter 204 operates by modulating and transmitting data signals received from controller 202. The modulation can be performed using any modulation technique known in the art, such as Binary Phase Shift Keying (BPSK). The carrier frequency applied to modulator 304 is derived from frequency reference 210. Frequency reference 210 supplies a fixed-frequency input to frequency generator 302. Frequency generator 302, which may be a phase locked loop (PLL) frequency synthesizer, produces a carrier frequency from among multiplicity of possible frequencies. Controller 202 programs the frequency of the signal produced by frequency generator 302 via signals coupled from controller 202 and frequency generator 302. The carrier frequency generated by frequency generator 302 is applied to modulator 304. The output of modulator 304 is applied to a power amplifier in transmission device 306. The output of the power amplifier is coupled to an air interface port such as an antenna to affect wireless transmission of the data signal.

Figure 4:
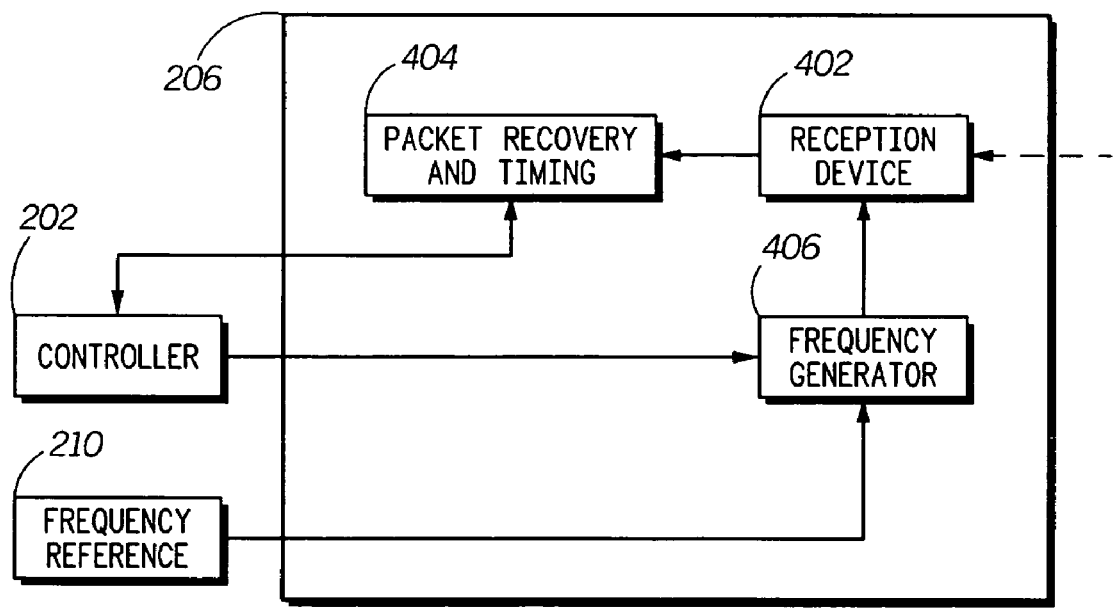
FIG. 4 is a block diagram of a receiver.

FIG. 4 is a block diagram of receiver 206 in accordance with an embodiment of the present invention. Receiver 206 comprises a reception device 402, a packet recovery and timing block 404 and a frequency generator 406. Reception device 402, typically comprising an amplifier and a mixer, receives various data packets and FSBs. The signals received at reception device 402 are amplified and frequency shifted from the carrier frequency to a lower intermediate frequency (IF). The frequency shifting is achieved by combining a Local Oscillator (LO) signal with the received signal. The LO signal is derived from frequency reference 210. Frequency reference 210 supplies a fixed-frequency input to frequency generator 406. Frequency generator 406, which may be a PLL frequency synthesizer, produces the LO frequency from among multiplicity of possible frequencies. The amplified and frequency shifted signals are coupled to 'packet recovery and timing block' 404. In this block, the received data packet is recovered from the modulated signal, and timing of receiver 206 is adjusted to allow synchronization with the incoming signal. The recovered packet is then coupled to a controller 202. Controller 202 distinguishes data packets from FSBs. Controller 202 also separates the data packet from the packet header. In addition, signals from controller 202 are coupled to frequency generator 406 in order to control the frequency of the signal produced. In addition, controller 202 may perform other activities relating to the system including transfer of the data to the application devices.

While the previous discussions on FIG. 2, FIG. 3 and FIG. 4 describe a transceiver 102, transceiver 104 can be regarded as being functionally identical to transceiver 102. Even though the two devices are functionally identical, frequency references 210 in the two transceivers may produce different frequencies due to inherent differences in their manufacturing. Two types of frequency references are known in the art: crystal based frequency references and integrated circuit based frequency references. Crystal based frequency references may be implemented using quartz crystals such as an AT-cut quartz blank. These frequency references are commonly used in cellular phones and other portable communications equipment. Examples of integrated circuit based frequency reference include ring oscillators. Frequency references 210 operate with a frequency stability, which determines the variance in the frequency generated by them.

Figure 5:
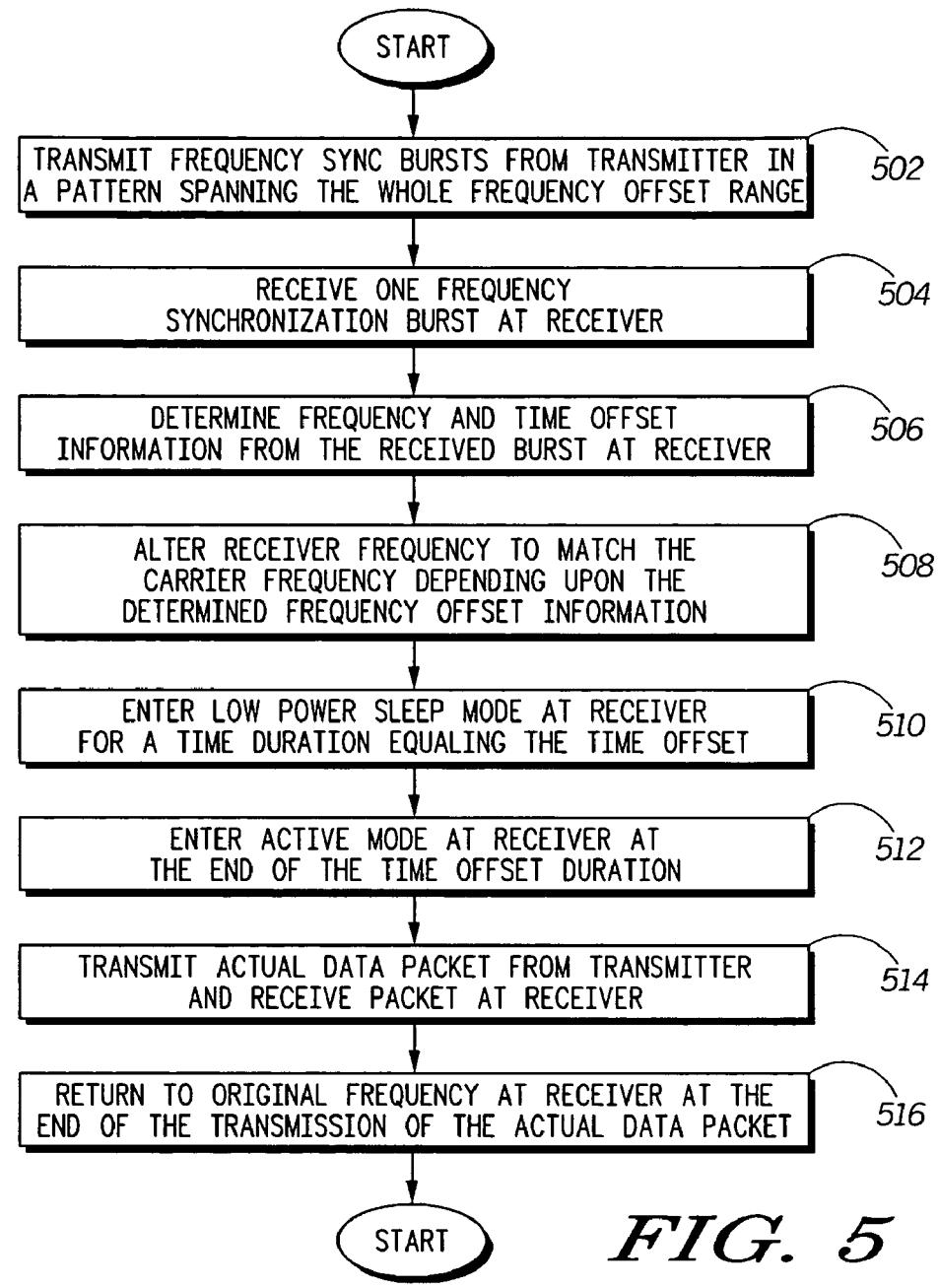
FIG. 5 is a flow chart illustrating the various steps of the present invention.

The frequency offset compensation technique of present invention involves transmission of FSBs by transceiver 102 for compensation of the frequency offset between transceiver 102 and transceiver 104. FIG. 5 is a flow chart illustrating the various steps of the present invention. Transceiver 102, acting as a transmitter, transmits FSBs in a pattern at step 502. The FSBs are distributed across a range of frequencies to span the expected range of the frequency offset. Transceiver 104, acting as a receiver, receives at least one of the FSBs, at step 504. Transceiver 104 receives the FSB that has been transmitted at a frequency sufficiently close to the operating frequency of transceiver 104. Transceiver 104 determines the time and frequency position information from the received FSB, at step 506. The time position information is the time offset between the received FSB and the beginning of the data packets associated with the received FSB. Alternatively, the time position information may be the time offset between the received FSB and some significant protocol time epoch such as a beacon transmission. The frequency position information is the difference between the frequency at which the FSB was transmitted and the frequency at which the associated data packets will be transmitted. Alternatively, the frequency position information may be a channel ID, and with a priori knowledge of the channel spacing, the receiver can determine the frequency difference between the FSB and the associated data packets. Thus, in order to receive the data packets, transceiver 104 alters its frequency according to the frequency position information, at step 508. Now, the frequency of transceiver 104 matches that of transceiver 102. Transceiver 104 goes into a low power sleep mode at step 510. In sleep mode, some circuits may be active, for example those required for timing and maintaining frequency stability, but most circuits essential for receiving data are turned off in order to minimize power consumption. Transceiver 104 maintains the low power sleep mode for a time period based on the time offset. When the time period has elapsed, transceiver 104 returns to active mode at step 512. Transceiver 102 transmits the data packets at step 514. Transceiver 104 receives the data packets at step 516. On completion of the exchange of data packets, transceiver 104 returns to its original frequency at step 518. Alternatively, transceiver 104 may elect to operate at the new frequency. This would be advantageous in cases where additional information in the FSB indicates that the transmitting device has very good frequency stability and should be considered an accurate frequency reference.

FIG. 5 also applies to a broadcast scenario in which a primary communication device, like a transmitter, is sending data packets to multiple secondary communication devices, like receivers. Each of the secondary communication devices may receive a different FSB, depending on its particular frequency offset with respect to the primary communication device. Then each secondary communication device follows steps 506 through 516 in order to receive the data packets.

Figure 6:
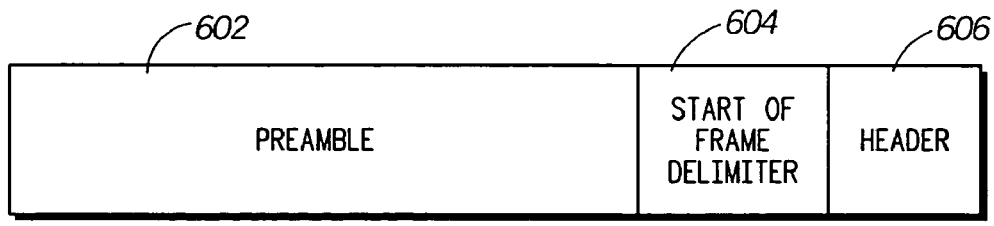
FIG. 6 shows a possible frequency synchronization burst format for the IEEE 802.15.4 standard.

The present invention involves the transmission of FSBs before an exchange of the associated data packets to accurately determine the frequency offset. A FSB is a small data packet containing the information about its relative position with respect to the associated data packets. For example, in case of IEEE 802.15.4™ standard, a FSB can be a shortened version of the data packet format specified by the standard. FIG. 6 shows a possible FSB format for the IEEE 802.15.4™ standard. This FSB format contains a preamble 602, a start-of-frame delimiter 604, and a header 606. Preamble 602 is 8 symbols in length and is used by the receiving device to acquire time synchronization with the chip and bit waveforms. Start-of-frame delimiter 604 is two symbols long and is used by the receiving device to acquire time synchronization to the start of the data portion of the packet. Header 606 contains one reserved bit and seven bits of information describing the number of bytes of data in the packet. The reserved header bit could be used to indicate whether this packet is a regular data packet or a FSB. The remaining seven bits may represent a compact representation of the time and frequency position information, or they could specify the length of a payload portion of the FSB. The payload portion of the FSB may provide more detailed information on time and frequency position of the FSB with respect to the data packets, as well as device and network identification numbers for the transmitting and/or receiving devices.

The information contained in the FSB may be implicit. For example, each FSB may have a unique FSB identification number assigned to it. Using a FSB identification number minimizes the size of the FSB. However, the relative offset in time and frequency of each FSB, in this case, is a common pre-determined value. For example, ten FSBs may be numbered 1 through 10, with the frequency and time offset values for each FSB being pre-defined and stored in a look-up table at the receiving end. Alternatively, the information contained in the FSB may indicate the relative time and frequency offset as measured in time and frequency units respectively. Value of the frequency and time units, such as 10 MHz steps for the frequency offset and 1 millisecond steps for the time offset, is pre-defined and known at the transmitter as well as the receiver ends. Along with the offset information, the FSB may also contain additional information. This information may include sender identification number, recipient identification number, network identification number, and the like. Inclusion of the additional information is subject to the amount of overhead that can be tolerated by the network.

Figure 7:
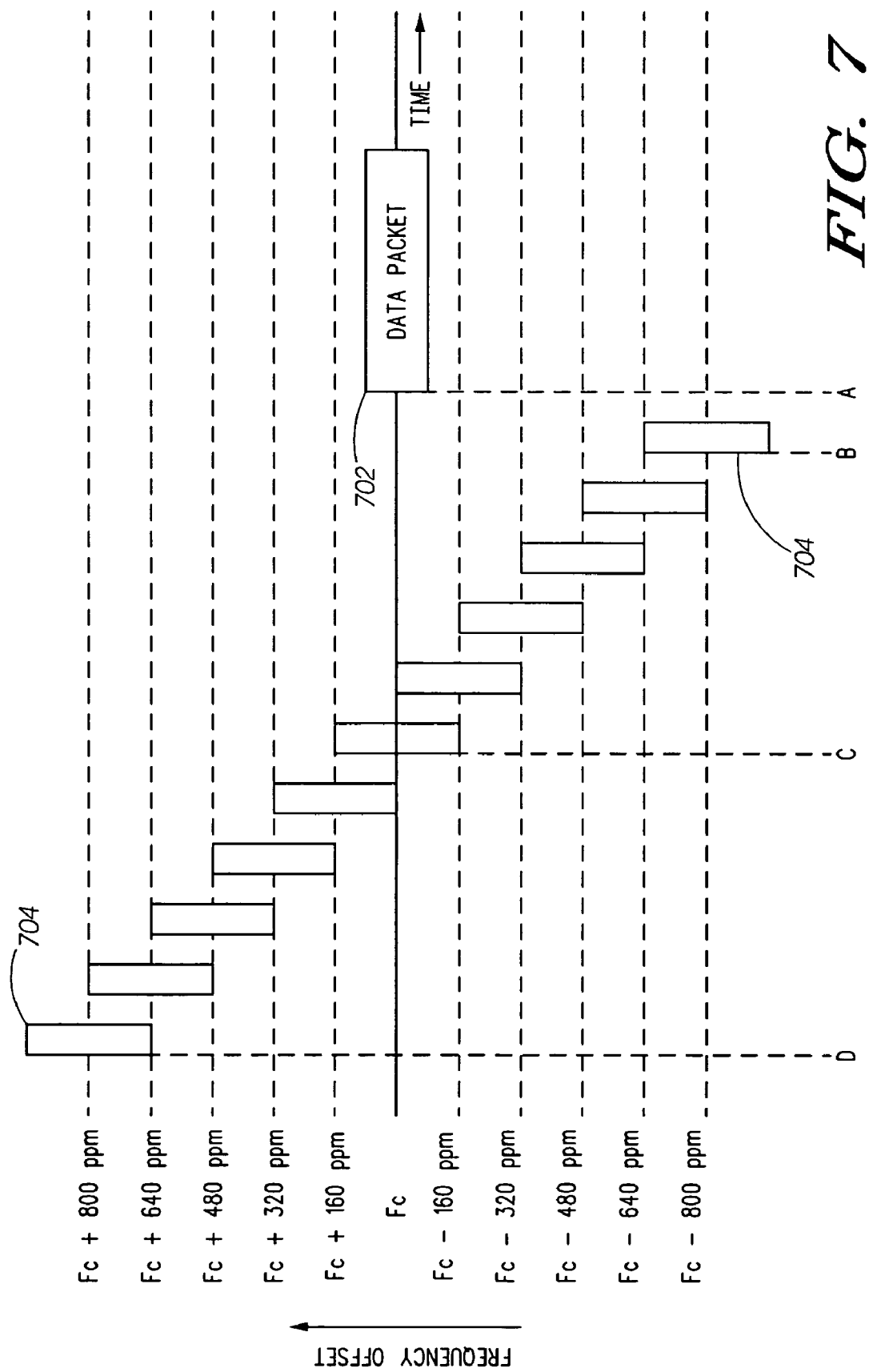
FIG. 7 shows a monotonic pattern for transmission of the frequency synchronization bursts in an IEEE 802.15.4™ environment.

Transmission of FSBs for the frequency offset compensation is done in a manner such that the expected range of the frequency offset is covered. One of the ways to achieve this is to transmit FSBs in a suitable pattern. A suitable pattern is formed by distributing FSBs over a frequency range. The pattern also involves transmitting the FSBs at regular intervals of time. The regular time intervals between FSBs ensure that transceiver 102 can generate FSBs for different frequencies. FIG. 7 shows a monotonic pattern for transmission of FSBs in an IEEE 802.15.4 environment. The frequency at which the desired transmission of data packet 702 takes place is indicated by Fc. A sequence of FSBs 704 is transmitted before the transmission of data packet 702. FSBs 704 are spread across a frequency range of 1600 parts per million (ppm), or 0.0016 Fc. The first FSB is transmitted at a frequency that is higher than Fc by 800 ppm. Each of the subsequent FSBs is transmitted at a frequency, which is lower by 160 ppm than the frequency at which the FSB preceding it was transmitted. Any active receiver, whose frequency offset is within +/−80 ppm of the frequency of a FSB, is able to capture any one of the FSBs and make appropriate adjustments before data packet 702 is transmitted. This is equivalent to the allowable frequency offset in IEEE 802.15.4 standard. IEEE 802.15.4 standard specifies that for effective exchange of data packets, the stability of frequency reference 210 should not vary by more than 40 ppm. Hence, the worst-case frequency offset, in this case, is 80 ppm. Therefore, the separation between two FSBs is set at 160 ppm. Consequently, a receiver having frequency exactly halfway between two adjacent FSBs can receive either one of them correctly. For example, if a receiver has the frequency offset of +720 ppm relative to Fc, then it can receive either FSB transmitted at Fc+800 ppm, or FSB transmitted at Fc+640 ppm. The pattern of transmission of FSBs shown in FIG. 7 allows transceiver 102 to simply step through a range of frequency offsets for generating FSBs 704 at varying frequencies. Since frequencies of two adjacent FSBs do not differ by a substantial amount, settling time of transceiver 102 while generating FSBs 704 is minimized. After the reception of a FSB, transceiver 104 may enter a low power sleep mode. By entering a low power sleep mode, transceiver 104 practically switches off. Transceiver 104 switches on or enters active mode just prior to the transmission of data packet 702.

The above-mentioned method for frequency offset compensation can be adapted for different types of networks. For example, there are networks that use beacons for time and frequency synchronization. The beacons are periodic packet transmissions used by a network coordinator to synchronize members of a network. They can also be used in networks without a coordinator. In the latter case, each member sends periodic beacons for identification and possible communication with any devices that may be listening. In many low-cost devices, frequency reference 210, used to derive the carrier frequency at the transmitter as well as receiver ends, is also used to derive timing for the periodic beacon transmissions. In such cases, frequency reference 210 also acts as the time base reference, and there is a relationship between the frequency offset and time offset when transmitting and receiving beacons. The time interval between the start of two beacon transmissions is termed as beacon period. When using FSBs prior to each beacon, the relative time offset of each FSB can be made a function of the beacon period. FIG. 7 also illustrates this timing relationship. The transmission of data packet 702 starts at time instance A. The lowest-frequency FSB 704 starts at a fixed time instance B before data packet 702. The start time for any other FSB is computed as the product of the beacon period, Tb, and the frequency offset (in ppm) of the FSB relative to the lowest frequency FSB. For example, the first FSB has a carrier frequency that is 1600 ppm higher than the last FSB, so the first FSB should be transmitted 0.0016 Tb prior to the last FSB. All receivers attempt to enter the active mode for the purpose of receiving a FSB at time instance C. The time difference between B and C is equal to 0.0008 times Tb (0.0008 is equivalent to 800 ppm). Receivers having a frequency offset from Fc are likely to wake up earlier or later than C by an amount proportional to Tb and their relative frequency offset in ppm. For example, a receiver whose frequency offset is −800 ppm with respect to Fc has a frequency reference that is oscillating too slowly. A beacon period timer based on this same frequency reference will have a beacon period that is 800 ppm too long, causing the receiving device to enter the active receive mode 0.0008 Tb later than expected, which is just in time to receive the FSB at time B. The FSB timing relationship described here minimizes the amount of time that a receiver spends in the active mode while searching for FSBs, and therefore maximizes the amount of time it spends in a low power sleep mode, extending its battery life.

Even devices that employ separate frequency and time base references, and therefore cannot take advantage of the relationship between frequency offset and time offset discussed above, can employ the present invention to extend their battery life. Still referring to FIG. 7, such a device, for example, may receive an FSB 704 at time D. Upon identifying FSB 704, the device can now determine a time interval to wait before the transmission of data packet 702 starts at time instance A. The device can now determine the difference between the time transmission of data packet 702 starts, and the time it was expected, and use this time offset information to make appropriate adjustments for the reception of future beacons.

FSBs 704 may span a frequency range that is considerably wider than the data packet bandwidth. To help reduce interference to neighboring frequency channels, special coding may be applied to FSBs 704. Pseudo-noise sequence coding is an example of special coding that can be applied in order to reduce interference. As specified in IEEE 802.15.4 standard, direct sequence spread spectrum (DSSS) is employed at the physical layer for packet transmission. The FSBs may use the same DSSS technique with a different spreading code in order to minimize interference. Such special coding is apparent to anyone skilled in the art.

Figure 8:
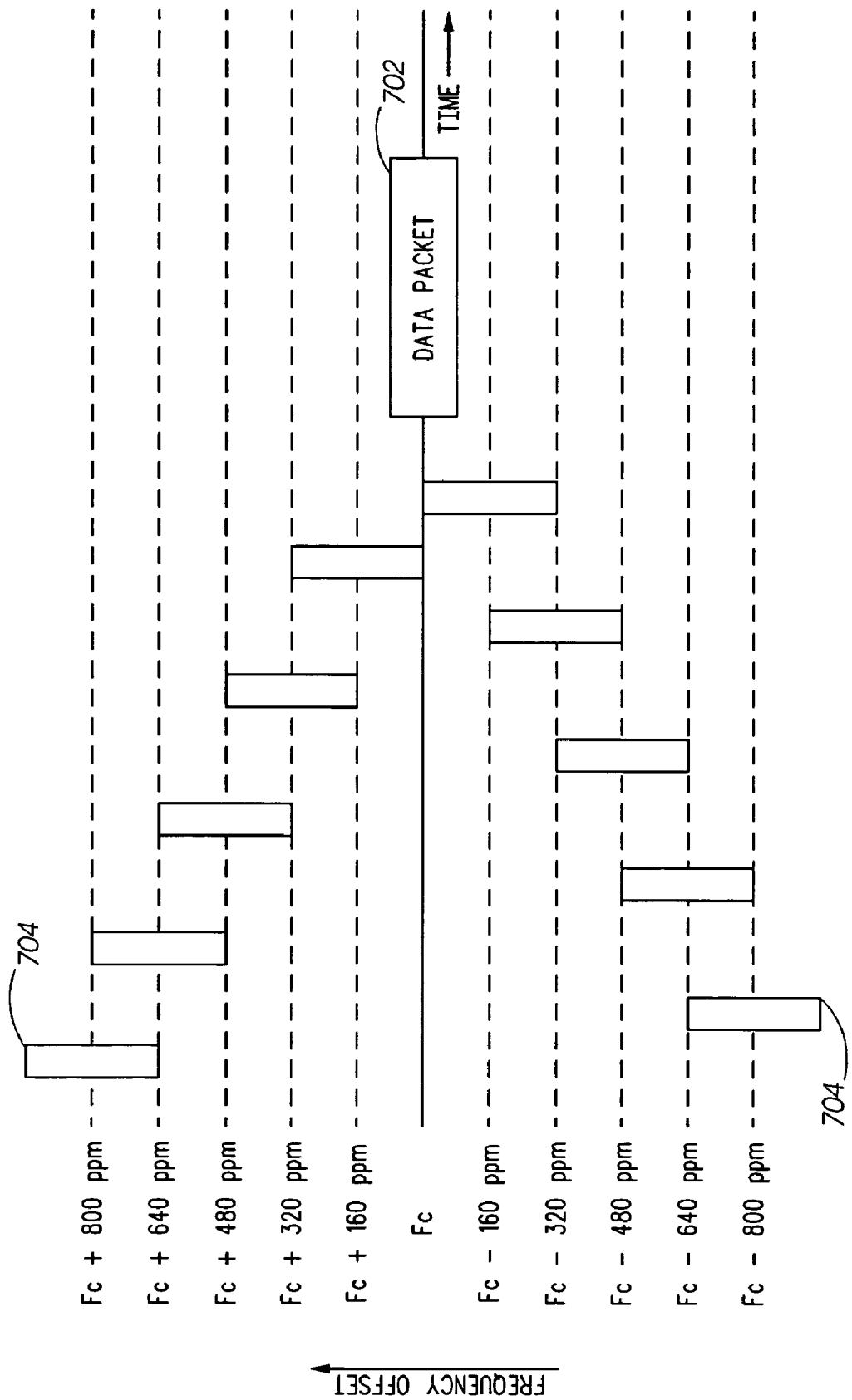
FIG. 8 shows a converging pattern of transmission of the frequency synchronization bursts.

Several alternative patterns of the transmission of FSBs are possible. FIG. 8 shows a converging pattern of the transmission of FSBs. The converging pattern does not require a FSB 704 being transmitted at Fc. In this pattern, devices that have the largest frequency offsets are given the most time to make adjustments in order to receive data packet 702.

Figure 9:
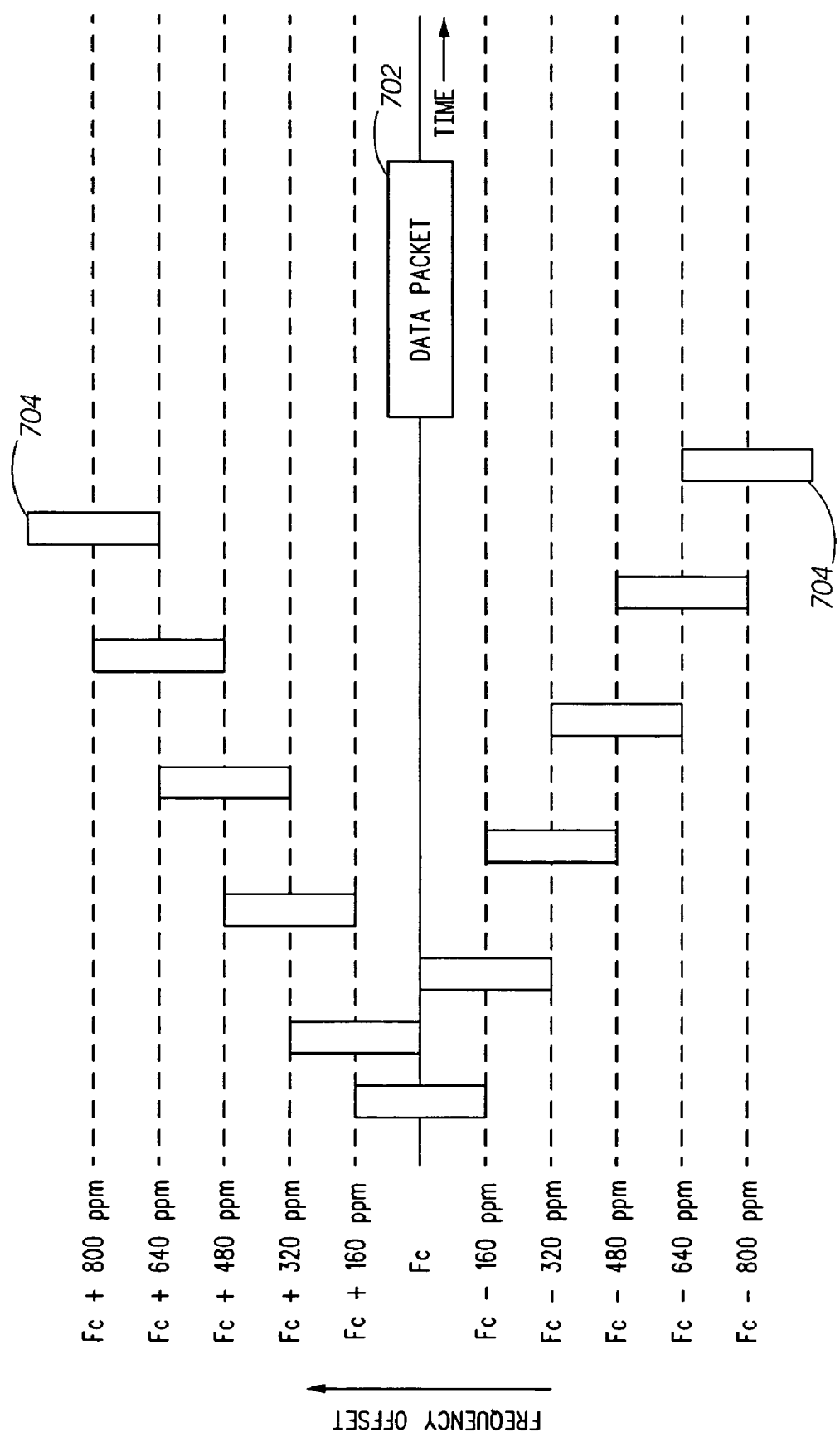
FIG. 9 shows a diverging pattern of transmission of the frequency synchronization bursts.

FIG. 9 shows a diverging pattern of the transmission of FSBs 704. This pattern allows devices with the smallest frequency offset, more time to remain in the low power sleep mode before the arrival of data packet 702. In cases where the frequency offset distribution is normally distributed around Fc, this may minimize the average time duration for which a receiver remains in active mode, when synchronizing in order to receive data packet 704.

Figure 10:
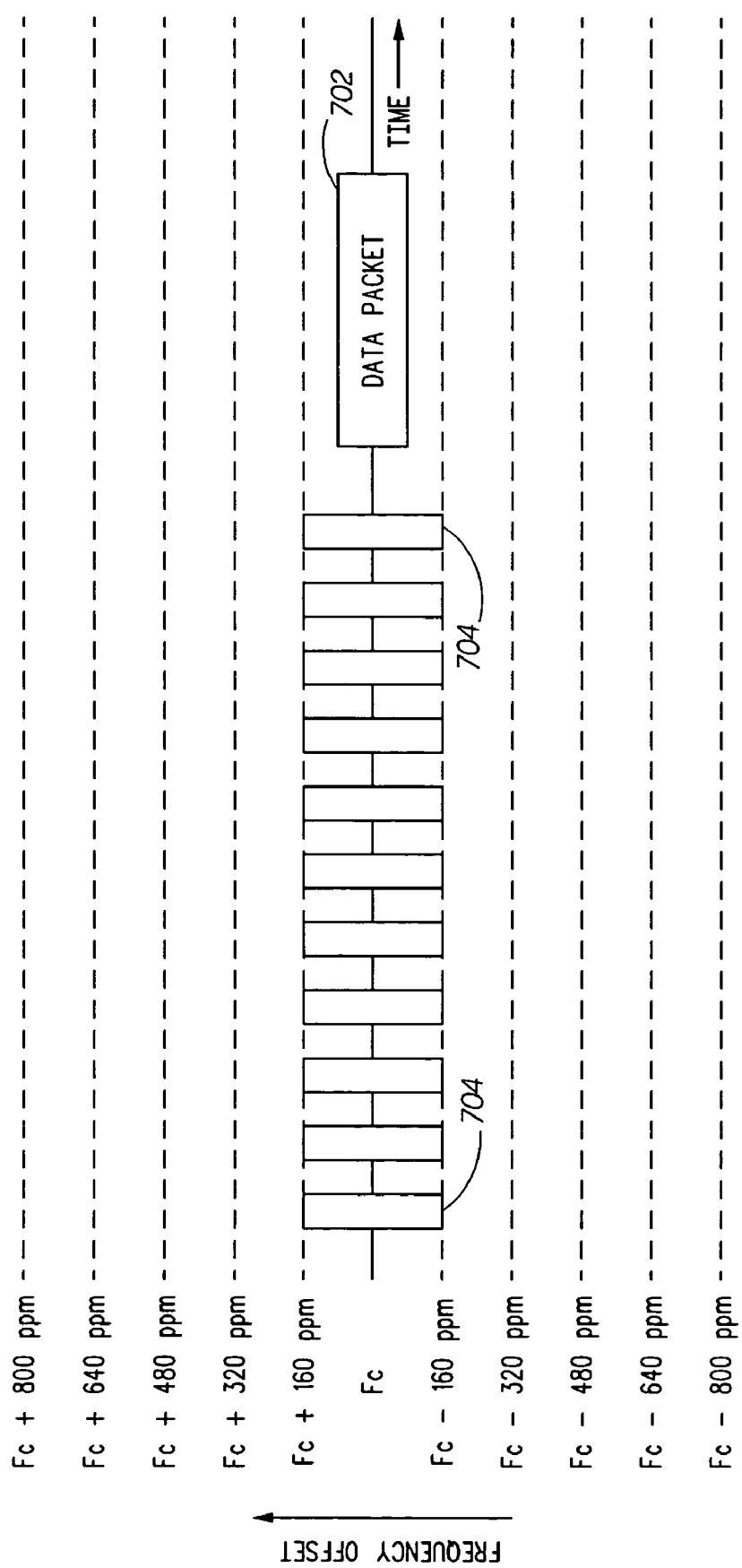
FIG. 10 shows a single-frequency pattern of transmission of the frequency synchronization bursts.

FIG. 10 shows a single-frequency pattern of the transmission of FSBs 704. This pattern requires that the receivers actively search for FSBs 704 over a range of frequency offsets. The advantage of this pattern is that it does not require transceiver 102 to generate FSBs 704 of various frequencies. Usage of this pattern allows the transmitting device to operate closer to the edge of its permitted spectral band and it minimizes interference between the systems on adjacent frequency channels. Due to the single frequency operation, FSBs 704 need not be interleaved with blank time intervals. However, time intervals between FSBs 704 may prove beneficial to receiver search algorithms. For example, the receiving device may search the expected range of frequency offsets by stepping through a set of frequency offsets using a monotonic, converging, or diverging pattern, and at each frequency offset putting the receiving device in active mode for a short amount of time and attempting to detect the presence of a FSB. The guard time between FSB's allows for receiver settling time when changing frequency. The use of the single-frequency FSB pattern is more efficient than simply lengthening the preamble field in the standard IEEE 802.15.4 data packet. The time offset information in each FSB allows a receiver to enter a low-power sleep mode prior to arrival of the data packet, thereby, conserving power for transceiver 104.

In an alternative embodiment of the present invention, it may not be necessary to use the FSBs before each communication session. This is dependent on the type of network in which the present invention operates. For example, in a star network topology, the network relies on coordinator devices that periodically send out beacon packets. In this case, the network coordinator may transmit the FSBs prior to the beacon packets. Other packets like data, commands, and acknowledgements may be exchanged following the beacon packet using the newly acquired frequency information from the FSBs transmitted prior to the beacons.

In yet a further alternate embodiment of the present invention, the number and pattern of FSBs is determined dynamically based on at least one system condition. More particularly, it is realized that after certain system criteria are met, the frequency offset between the transmitting and receiving devices is likely not at the specification extremes. Thus, certain FSBs, for example those at the specification extremes, may be eliminated with little or no reduction of network performance, and with several benefits, including reduced interference and reduced power consumption by the transmitting device. Such FSB transmission schemes include:

Relating the number of FSBs transmitted to a type of message to be transmitted. For example, a full sync burst pattern can be used for network beacons, which are received by all devices including newly-originating devices, while a subset of the sync bursts is used with data packets or acknowledgements between devices already within the network. Similarly, the full sync-burst pattern may be used for broadcast messages, while a subset of the sync-burst pattern is utilized for unicast messages.

Relating the number of FSBs transmitted to a network time period. For example, a full sync burst pattern may be used during certain times of the day, as determined by the transmitting device, and a subset of the sync bursts is used at other times of the day. The use of full sync burst patterns during certain time periods improves system performance by enabling the device to make a tradeoff between communication reliability and generated interference to other services. For example, at times when there is little use of the frequency band by other services (e.g., at night), the device may employ a full sync burst pattern without likelihood of interfering with the other services. However, at times when other services are active (e.g., during the day), the device may elect to trade some amount of communication reliability for reduced interference (and better coexistence) with the other services, by employing a subset of the sync bursts.

Relating the number of FSBs transmitted to network traffic. For example, a full sync burst pattern may be used during periods of low network traffic, and a subset of the sync bursts is used during periods of high network traffic. This can improve system performance by enabling the device to make a tradeoff between communication reliability and generated interference to other devices in its network. During periods of low network traffic, transmission of a full sync-burst pattern is unlikely to interfere with transmissions of other network devices, since such transmissions are rare. However, during periods of high network traffic, network devices transmit frequently, and it is more likely that transmission of a full sync burst would cause interference with other network devices. Transmission of a subset of the sync bursts is more appropriate under this system condition, since it is less likely to cause interference with other network devices.

Relating the number of FSBs transmitted to a position in a message sequence. For example, a beaconing network member can distribute the full sync burst pattern over several beacons. The full sync burst pattern is divided into N subsets that are distributed over a sequence of N beacons. The division of the full sync burst pattern into subsets, and the order in which the subsets are transmitted, may be predetermined, or performed upon message generation. Using this scheme reduces the average number of FSBs transmitted per beacon; this is traded for a potentially lengthened beacon detection time, since the average time between transmission of a particular FSB is lengthened.

Relating the number of FSBs transmitted to a network formation or growing process. For example, a full set of FSBs (or alternatively, those FSBs at the frequency extremes) can be used when a network is forming, or when additional members are allowed to join the network. At other times, a subset of this set of FSBs can be used. Because those units joining a network have a higher probability of joining at the frequency extremes, using those FSBs at the frequency extremes will be beneficial for joining units.

Relating the number of FSBs transmitted to the known stability of the transmit and receive devices. For example, messages sent to or from high-stability devices in the network can be accompanied by few or no FSBs, while messages sent to or from low-stability devices can be accompanied by a larger set of FSBs.

Relating the number of FSBs transmitted to the time elapsed since a most recent communication with a device, possibly including a most recent beacon transmission. Longer time periods between communications generally lead to more drift in time and frequency due to variations of environmental factors such as temperature. Therefore, using FSBs at the frequency extremes will serve these units better.

Relating the number of FSBs transmitted according to a time or frequency offset of a received message from a target device. For example, a set of FSBs at the frequency extremes (or alternatively, all FSBs available) can be used before a message has been received from a target device. Once a message has been received and the frequency offset is known, the number of FSBs is reduced.

Relating the number of FSBs transmitted according to a failed communication attempt. For example, a device will first attempt to communicate with a target device using one FSB and then increases the number of FSBs on subsequent attempts if the target device fails to respond.

Relating the number of FSBs transmitted according to a message Quality of Service (QoS). For example, a streaming video communication session is established by the transmission of a first message with a full sync burst pattern; a subset of the sync burst pattern is used for subsequent video messages. Other message types, with lower QoS requirements, do not vary their sync burst pattern. This scheme maximizes the likelihood of communicating with the target device on the first transmission, thereby minimizing session setup latency, and reduces communication overhead for subsequent messages, thereby maximizing data throughput.

Figure 11:
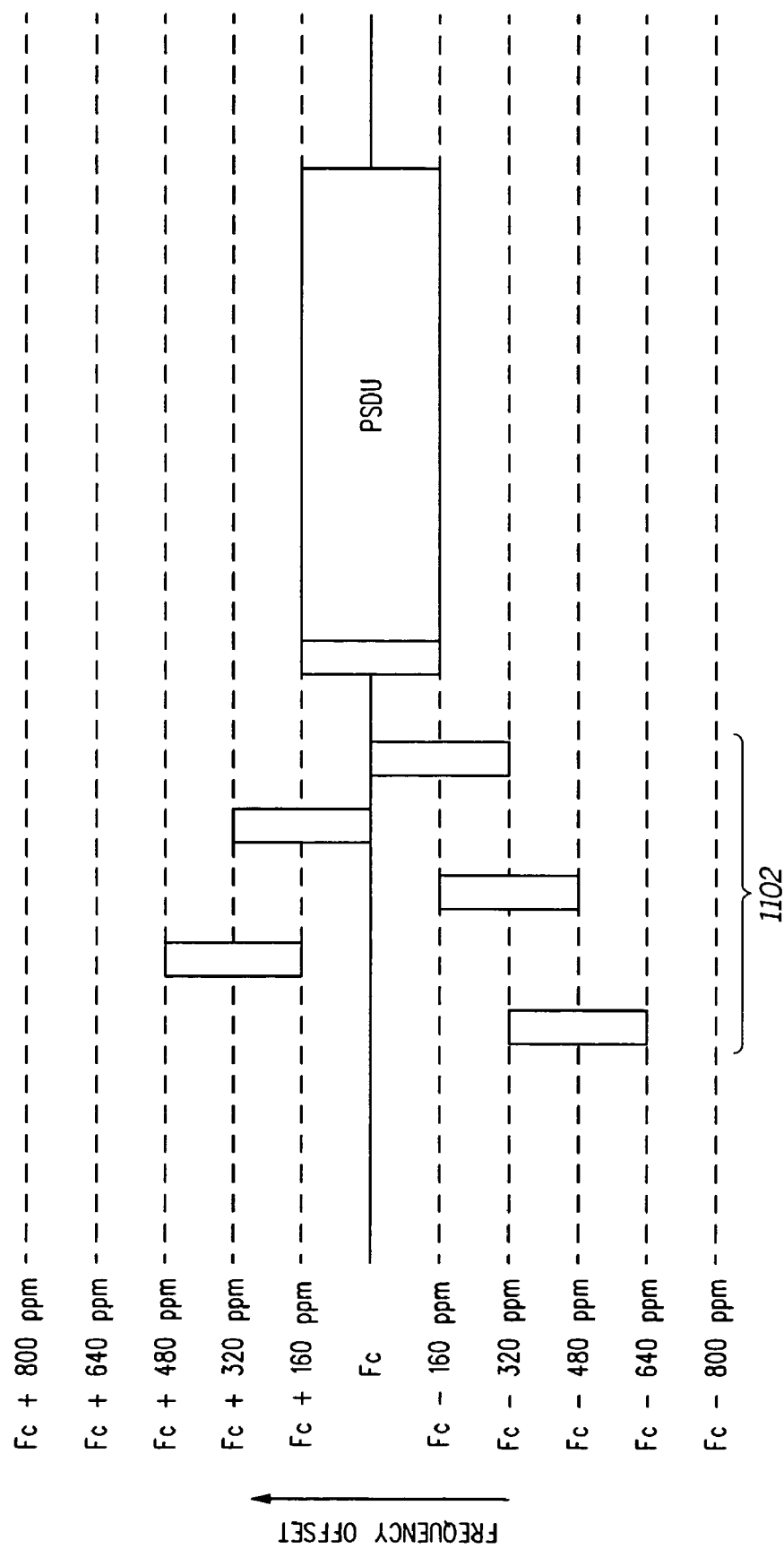
FIG. 11 shows a subset of a sync-burst pattern.

FIG. 11 shows the transmission of a subset 1102 of the full sync burst pattern of FSBs 704 shown in FIG. 8. As is evident, subset 1102 contains fewer FSBs and spans a smaller range of frequencies than the full FSB pattern, thereby reducing potential interference to other network devices and reducing transmit power consumption. As described in some of the preceding schemes, this subset of FSBs could be transmitted when the receiving and transmitting devices are expected to have reduced frequency offset.

Figure 12:
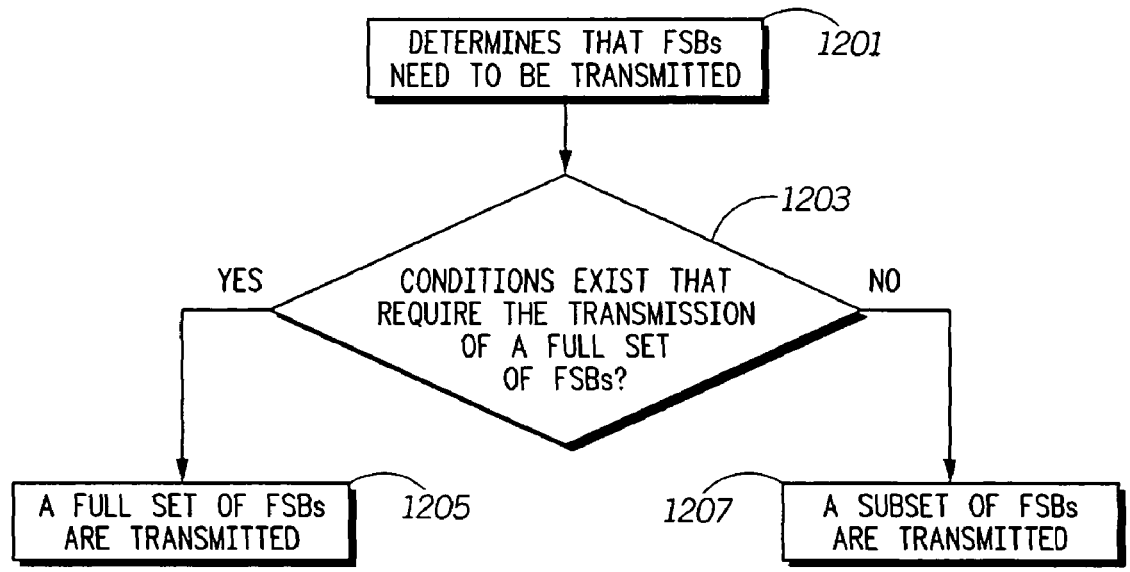
FIG. 12 is a flow chart showing operation of a transmitter transmitting a subset of sync-bursts.

FIG. 12 is a flow chart showing operation of a transmitter transmitting a subset of sync-bursts in response to certain system criteria being met. The logic flow begins at step 1201 where controller 202 determines that FSBs need to be transmitted. At step 1203 controller 202 analyzes a system condition and determines if a system conditions exist that require the transmission of a full set of FSBs. As discussed above, step 1203 may entail analyzing a type of message is to be transmitted, a time of day, a level of network traffic, a position in a message sequence, whether a network is forming, or accepting new members, a time elapsed since a most recent communication with a particular device, a time or frequency offset of a received message from a target device, if a failed communication attempt has occurred, and a message Quality of Service.

Continuing, if at step 1203 it is determined that system conditions exist that require the transmission of the full set of FSBs, then the logic flow continues to step 1205 where a full set of FSBs are transmitted as described above with reference to FIGS. 7-10. In particular, at a first sync-burst period, a first plurality of synchronization bursts are transmitted over a first plurality of frequency offsets, where the first plurality of frequency offsets span the maximum range of allowable frequency offsets.

If however, at step 1203, controller 202 determines that system conditions do not require the transmission of a full set of FSBs, the logic flow continues to step 1207 where a subset of FSBs are transmitted. More particularly, at a second sync-burst period, a subset of the first plurality of synchronization bursts are transmitted over a subset of the first plurality of frequency offsets when the system condition exists. As discussed above, the subset FSBs transmitted may include one of a plurality of possible subsets. For example, if the full sync burst pattern is divided into N subsets, then the Nth subset could be sent on every Nth beacon.

Another embodiment of the present invention may cater to an exchange of data packets between two or more devices. In this case, the FSBs may only be sent at the beginning of the exchange by the device that initiates this exchange. Other devices may tune their frequencies as close as possible to the frequency of the initiating device before sending any packets. After the packet exchange is complete, the other devices may either continue with their new frequency or return to their original frequency settings. In case of the initiating device being a network coordinator or if it has a good stability, maintaining the new frequency may be preferred. In case of general peer-to-peer communications or devices having poor stability, it may be preferred that the device returns to its original frequency settings.

Furthermore, the frequency offset information, which is determined by each receiving device on receiving a FSB, can be reported back to the transmitting device that sent the FSB. The frequency offset information can also be shared with other devices in the network. This information may be used in a network synchronization algorithm. For example, a network coordinator may gather the frequency offset information from other devices in the network and use the distribution to adjust its own operating frequency. Specifically, the network coordinator may adjust its operating frequency such that the mean or median frequency offset of the other devices is close to zero.

In another embodiment of the present invention, transceivers 102 and 104 may operate in a wireline system employing bandpass communication. In this type of communication, information is modulated onto a carrier wave prior to its transmission. The transmission takes place over a physical medium like copper wire. A number of wireline communication systems, such as telephone modems and cable modems, use bandpass modulation techniques, in which information is modulated onto a carrier. There may exist a carrier frequency offset between the transmitter and the receiver in this case as well. The frequency offset compensation technique of the present invention serves the purpose of eliminating this frequency offset.

The frequency offset compensation technique of the present invention solves the problem of large frequency offsets between the transmitter and the receiver. The transmission of FSBs before the transmission of actual data packets helps in mitigating large frequency offsets, thereby, ensuring effective exchange of data. The FSBs used in the present invention are very small packets and do not add any substantial overhead to the operation of the devices. Conventional methods for frequency offset compensation involve scaling the bandwidth of the signal and transceiver 104. For example, differential chip detection in DSSS type of modulation involves incrementing the rate at which data is transmitted. The present invention does not require any such scaling.

In accordance with the present invention, transceiver 104 is allowed to enter a low power sleep mode after determining the exact start time of the transmission of data packet from transceiver 102. This ensures that there is no wastage of power at transceiver 104 and hence the power consumption is lowered. The low power consumption allows for the use of small size batteries, further reducing the size of transceiver 104. Thus, the compensation technique of the present invention is ideally suitable for applications where size, cost, or power consumption are critical to the performance of the application.

The frequency offset compensation technique of the present invention can be implemented on existing wireless networks without any substantial changes to the network configuration. The present invention can be implemented as a combination of Digital Signal Processing (DSP) chips using Application Specific Integrated Circuit (ASIC) technology.

The frequency offset compensation technique of the present invention is suitable for low-cost and low-rate wireless networks, where frequency stability of the network elements is poor. Applications of the present invention include, but are not limited to, wireless sensors, automation and control devices, tracking devices used in logistics, and entertainment devices such as video games. Industry standards such as IEEE 802.15.4 and Zigbee™ address such applications. Embodiments of the present invention may be incorporated into future versions of these standards to provide improved tolerance of frequency instability and reduced cost of the network device.

While the invention has been particularly shown and described with reference to a particular embodiment, it will be understood by those skilled in the art that various changes in form and details may be made therein without departing from the spirit and scope of the invention. For example, system criteria other than those described may be used to relate the number of FSBs transmitted, and FSB subsets differing from those described may be transmitted. It is intended that such changes come within the scope of the following claims.

The invention claimed is:

1. A method for transmitting using a transmitter a plurality of synchronization bursts for time or frequency offset compensation, the method comprising the steps of:
    determining in a controller associated with the transmitter a system condition, wherein determining the system condition includes determining a time of day; and
    based on the system condition, the transmitter either transmitting a first plurality of synchronization bursts over a first plurality of frequencies or transmitting a second plurality of synchronization bursts over a second plurality of frequencies.

2. A method for transmitting using a transmitter a plurality of synchronization bursts for time or frequency offset compensation, the method comprising the steps of:
    determining in a controller associated with the transmitter a system condition, wherein determining the system condition includes determining a level of network traffic; and
    based on the system condition, the transmitter either transmitting a first plurality of synchronization bursts over a first plurality of frequencies or transmitting a second plurality of synchronization bursts over a second plurality of frequencies.

3. A method for transmitting using a transmitter a plurality of synchronization bursts for time or frequency offset compensation, the method comprising the steps of:
    determining in a controller associated with the transmitter a system condition, wherein determining the system condition includes determining a position in a message sequence; and
    based on the system condition, the transmitter either transmitting a first plurality of synchronization bursts over a first plurality of frequencies or transmitting a second plurality of synchronization bursts over a second plurality of frequencies.

4. A method for transmitting using a transmitter a plurality of synchronization bursts for time or frequency offset compensation, the method comprising the steps of:
    determining in a controller associated with the transmitter a system condition, wherein determining the system condition includes determining that a network is forming, or accepting new members; and
    based on the system condition, the transmitter either transmitting a first plurality of synchronization bursts over a first plurality of frequencies or transmitting a second plurality of synchronization bursts over a second plurality of frequencies.

5. A method for transmitting using a transmitter a plurality of synchronization bursts for time or frequency offset compensation, the method comprising the steps of:
    determining in a controller associated with the transmitter a system condition, wherein determining the system condition includes determining a time elapsed since a most recent communication with a device; and
    based on the system condition, the transmitter either transmitting a first plurality of synchronization bursts over a first plurality of frequencies or transmitting a second plurality of synchronization bursts over a second plurality of frequencies.

6. A method for transmitting using a transmitter a plurality of synchronization bursts for time or frequency offset compensation, the method comprising the steps of:
    determining in a controller associated with the transmitter a system condition, wherein determining the system condition includes determining if a failed communication attempt has occurred; and
    based on the system condition, the transmitter either transmitting a first plurality of synchronization bursts over a first plurality of frequencies or transmitting a second plurality of synchronization bursts over a second plurality of frequencies.

7. An apparatus for transmitting a plurality of synchronization bursts for time or frequency offset compensation, the apparatus comprising:
    a transmitter; and
    a controller associated with the transmitter for analyzing a system condition, wherein the system condition includes a time of day;
    wherein the transmitter either transmitting a first plurality of synchronization bursts over a first plurality of frequencies or transmitting a second plurality of synchronization bursts over a second plurality of frequencies based on the system condition.

8. An apparatus for transmitting a plurality of synchronization bursts for time or frequency offset compensation, the apparatus comprising:
    a transmitter; and
    a controller associated with the transmitter for analyzing a system condition, wherein the system condition includes a level of network traffic;
    wherein the transmitter either transmitting a first plurality of synchronization bursts over a first plurality of frequencies or transmitting a second plurality of synchronization bursts over a second plurality of frequencies based on the system condition.

9. An apparatus for transmitting a plurality of synchronization bursts for time or frequency offset compensation, the apparatus comprising:
    a transmitter; and
    a controller associated with the transmitter for analyzing a system condition, wherein the system condition includes a position in a message sequence;
    wherein the transmitter either transmitting a first plurality of synchronization bursts over a first plurality of frequencies or transmitting a second plurality of synchronization bursts over a second plurality of frequencies based on the system condition.

10. An apparatus for transmitting a plurality of synchronization bursts for time or frequency offset compensation, the apparatus comprising:
- a transmitter; and
- a controller associated with the transmitter for analyzing a system condition, wherein the system condition includes whether a network is forming, or accepting new members;
- wherein the transmitter either transmitting a first plurality of synchronization bursts over a first plurality of frequencies or transmitting a second plurality of synchronization bursts over a second plurality of frequencies based on the system condition.

11. An apparatus for transmitting a plurality of synchronization bursts for time or frequency offset compensation, the apparatus comprising:
- a transmitter; and
- a controller associated with the transmitter for analyzing a system condition, wherein the system condition includes a time elapsed since a most recent communication with a device;
- wherein the transmitter either transmitting a first plurality of synchronization bursts over a first plurality of frequencies or transmitting a second plurality of synchronization bursts over a second plurality of frequencies based on the system condition.

12. An apparatus for transmitting a plurality of synchronization bursts for time or frequency offset compensation, the apparatus comprising:
- a transmitter; and
- a controller associated with the transmitter for analyzing a system condition, wherein the system condition includes if a failed communication attempt has occurred;
- wherein the transmitter either transmitting a first plurality of synchronization bursts over a first plurality of frequencies or transmitting a second plurality of synchronization bursts over a second plurality of frequencies based on the system condition.

* * * * *